US009175699B2

(12) United States Patent
Ishibashi et al.

(10) Patent No.: US 9,175,699 B2
(45) Date of Patent: Nov. 3, 2015

(54) AIR CUSHION MECHANISM OF PNEUMATIC CYLINDER

(75) Inventors: Kouichirou Ishibashi, Tsukubamirai (JP); Seiji Takanashi, Tsukubamirai (JP); Motohiro Sato, Tsukubamirai (JP)

(73) Assignee: SMC CORPORATION, Tokyo (JP)

( * ) Notice: Subject to any disclaimer, the term of this patent is extended or adjusted under 35 U.S.C. 154(b) by 1285 days.

(21) Appl. No.: 12/782,181

(22) Filed: May 18, 2010

(65) Prior Publication Data

US 2010/0307876 A1 Dec. 9, 2010

(30) Foreign Application Priority Data

Jun. 3, 2009 (JP) ................................ 2009-134383

(51) Int. Cl.
*F16F 9/00* (2006.01)
*F15B 15/22* (2006.01)
*F15B 15/14* (2006.01)

(52) U.S. Cl.
CPC ........... *F15B 15/228* (2013.01); *F15B 15/1404* (2013.01)

(58) Field of Classification Search
USPC ........................................................ 267/119
See application file for complete search history.

(56) References Cited

U.S. PATENT DOCUMENTS

| | | | | |
|---|---|---|---|---|
| 3,067,726 | A * | 12/1962 | Williams | 91/395 |
| 5,307,729 | A * | 5/1994 | Hedlund | 91/394 |
| 5,335,583 | A * | 8/1994 | Kaneko et al. | 92/13.5 |
| 5,692,429 | A * | 12/1997 | Sonntag | 91/395 |
| 6,014,924 | A * | 1/2000 | Stoll et al. | 92/13.5 |
| 6,177,743 | B1 * | 1/2001 | Hartramph et al. | 310/89 |
| 6,371,460 | B1 * | 4/2002 | Orihara | 267/137 |
| 6,400,047 | B1 * | 6/2002 | Hartramph et al. | 310/12.33 |
| 6,539,834 | B1 * | 4/2003 | Takanashi et al. | 92/85 R |
| 7,225,722 | B2 * | 6/2007 | Angue et al. | 92/88 |
| 7,290,479 | B2 * | 11/2007 | Williams et al. | 92/88 |
| 7,581,485 | B2 * | 9/2009 | Riedel | 91/395 |
| 2001/0035090 | A1 * | 11/2001 | Sato et al. | 91/394 |
| 2007/0012532 | A1 * | 1/2007 | Riedel | 188/322.17 |

FOREIGN PATENT DOCUMENTS

| | | |
|---|---|---|
| DE | 297 06 098 | 7/1997 |
| DE | 299 15 756 | 12/1999 |

(Continued)

OTHER PUBLICATIONS

Office Action issued Nov. 12, 2010, in German Patent Application No. 10 2010 022 286.0-14, filed May 31, 2010 (with English language translation).

(Continued)

*Primary Examiner* — Robert A Siconolfi
*Assistant Examiner* — James Hsiao
(74) *Attorney, Agent, or Firm* — Oblon, McClelland, Maier & Neustadt, L.L.P.

(57) ABSTRACT

A body-side cushion structural body attached to a body and a piston-side cushion structural body integrally moving with a piston are disposed outside the body, a cushion rod is disposed on either one of the cushion structural bodies, while a rod fitting hole is disposed in the other cushion structural body, a cushion packing is disposed at a spout portion of the rod fitting hole, and moreover, a throttle valve that discharges air in the rod fitting hole to the outside with flow-rate adjustment is disposed so as to configure an air cushion mechanism that stops the piston in a buffering manner.

12 Claims, 3 Drawing Sheets

(56) References Cited

FOREIGN PATENT DOCUMENTS

| | | | |
|---|---|---|---|
| DE | 10 2005 032 853 | | 2/2007 |
| JP | 47-33590 | U | 12/1972 |
| JP | 8-42513 | A | 2/1996 |
| JP | 10-318214 | | 12/1998 |
| JP | 2002-266813 | A | 9/2002 |
| JP | 2006-46500 | | 2/2006 |
| KR | 10-0166223 | | 12/1998 |

OTHER PUBLICATIONS

Office Action issued Feb. 5, 2013, in Japanese Patent Application No. 2009-134383 with English translation.

Korean Office Action issued Feb. 22, 2012, in Korean Patent Application No. 10-2010-0048400 (with English translation).

* cited by examiner

AIR CUSHION MECHANISM OF PNEUMATIC CYLINDER

BACKGROUND OF THE INVENTION

1. Field of the Invention

The present invention relates to an air cushion mechanism which can stop a piston at an arbitrary set position in a pneumatic cylinder in a buffering manner.

2. Description of the Related Art

As an air cushion mechanism for stopping a piston in a pneumatic cylinder in a buffering manner, those for giving a cushion action to a piston by temporarily having compressed air in a discharge-side pressure chamber remain have been known as disclosed in Patent Document 1 (Japanese Unexamined Patent Application Publication No. 2006-46500), for example. This type of air cushion mechanism has the discharge-side pressure chamber in a cylinder chamber opened into the air through a throttle valve in the vicinity of a dead end of a piston stroke so as to temporarily seal the discharge air in the discharge-side pressure chamber and to stop the piston in a buffering manner. This is advantageous in that a large impact absorbing capability can be exerted since an impact at the stroke end is absorbed using compressibility of air remaining in the discharge-side pressure chamber.

As the above air cushion mechanism, in the vicinity of the dead end of the piston stroke, means for switching a main discharge system having performed discharge of the compressed air from the cylinder chamber to a cushion discharge system for discharging it to the air from the discharge-side pressure chamber through a throttle valve is disposed, and as the means for switching, a mechanism is widely used such that, in the vicinity of the dead end of the piston stroke, a cushion ring disposed at a distal end of a piston is fitted in a cushion packing at a spout portion in a recess part having the main discharge system formed in a head cover of a cylinder, by which the main discharge system is closed, and the compressed air sealed in the pressure chamber is gradually discharged to the outside through the cushion discharge system opened into the discharge-side pressure chamber.

On the other hand, in the one disclosed in Patent Document 1, a bypass opening/closing valve as means for switching the main discharge system to the cushion discharge system in the vicinity of the dead end of the piston stroke is disposed in a cushion unit disposed on the outside of a body (main body), and the bypass opening/closing valve is operated by a stroke adjusting bolt disposed on a stopper plate on a table driven in synchronization with the piston.

However, in either case, with this type of air cushion mechanisms, since the main discharge system is switched to the cushion discharge system in the vicinity of the dead end of the piston stroke, though a cushion-operation start position of the piston can be adjusted, a final stop position of the piston is set on the basis of a structure in the vicinity of a stroke end of the body, and the stop position of the piston stopped in a buffering manner cannot be set arbitrarily unless the internal structure of the body is changed.

In addition, the prior-art air cushion mechanism is configured so that the piston is stopped in a buffering manner by the internal structure of the body, and in order to stop the piston in a pneumatic cylinder not provided with an air cushion mechanism in a buffering manner, use of a damper made up of a viscoelastic body with relatively small impact absorbing capability has been an only available idea.

SUMMARY OF THE INVENTION

A technical problem of the present invention is to enable stop of a piston at an arbitrary set position in a buffering manner in an air cushion mechanism disposed in a pneumatic cylinder.

Another technical problem of the present invention is to exert an impact absorbing function by an air cushion mechanism independent from an air supply/discharge system of a pneumatic cylinder without using compressibility of air remaining in a discharge-side pressure chamber of a cylinder, by which an air cushion mechanism exerting a large impact absorbing capability can be applied also to an existing pneumatic cylinder not provided with the air cushion mechanism.

In order to solve the above problem, according to the present invention, an air cushion mechanism of a pneumatic cylinder is provided in which, in a pneumatic cylinder provided with a piston slidably fitted into a cylinder chamber of a body, there are provided a cushion structural body on the body side attached to the outside of the body and a cushion structural body on the piston side arranged on the outside of the body opposing a sliding direction of the piston with respect to the body-side cushion structural body and moving integrally with the piston, a cushion rod protruding toward the other cushion structural body is disposed on either one of the cushion structural bodies, a rod fitting hole opened opposing the cushion rod is disposed in the other cushion structural body, a cushion packing sealing a gap between the cushion rod and the rod fitting hole when the cushion rod is fitted into the rod fitting hole is disposed on a spout portion of the rod fitting hole, and moreover, a throttle valve causing the rod fitting hole to communicate with the outside through a throttle capable of adjusting a flow rate is disposed so as to configure an air cushion mechanism that stops the piston in a buffering manner, and by making set positions of the cushion rod and the rod fitting hole capable of relative adjustment in the sliding direction of the piston, a piston position when the cushion rod is fitted into an inner end of the rod fitting hole can be set arbitrarily.

In the present invention, the cushion packing is formed by packing having a check valve function that prevents outflow of air to the outside from the rod fitting hole but allows inflow of air from the outside into the rod fitting hole.

In addition, in the present invention, a damper made of a viscoelastic body which alleviates a colliding force when the cushion rod collides against the inner end of the rod fitting hole is attached to a damper attachment hole disposed at the distal end of the cushion rod so that it sinks into the damper attachment hole at a stroke end of the cushion rod.

In this case, it is preferable that the damper attachment hole has a large diameter part in the middle, and the damper has a locking flange part in the middle so that the locking flange part is locked with the large diameter part and the damper is prevented from escaping from the damper attachment hole.

In a preferred embodiment of the present invention, the cushion rod is attached to the one cushion structural body capable of positional adjustment so that the piston position is set by the positional adjustment of the cushion rod.

In another preferred embodiment of the present invention, at least one of the attachment position of the cushion structural body on the body side with respect to the body and the attachment position of the cushion structural body on the piston side with respect to the piston is made capable of adjustment, and by moving the one cushion structural body in the sliding direction of the piston with respect to the other cushion structural body, the piston position is set.

Moreover, in another preferred embodiment of the present invention, a slidable table is connected to a piston rod connected to the piston and led out to the outside from the cylinder chamber along a guide installed in parallel with the sliding direction of the piston on the body, and the cushion structural body on the piston side is attached to the table.

According to the air cushion mechanism of the pneumatic cylinder of the present invention described above in detail, since the air cushion mechanism that can stop the piston at an arbitrary set position in a buffering manner can be obtained and the impact absorbing function can be exerted by the air cushion mechanism independent from the air supply/discharge system of the pneumatic cylinder without using compressibility of the air remaining in the discharge-side pressure chamber of the cylinder, the air cushion mechanism that exerts a large impact absorbing capability can be applied even to an existing pneumatic cylinder not provided with the air cushion mechanism.

DESCRIPTION OF THE PREFERRED EMBODIMENTS

Figure 1:
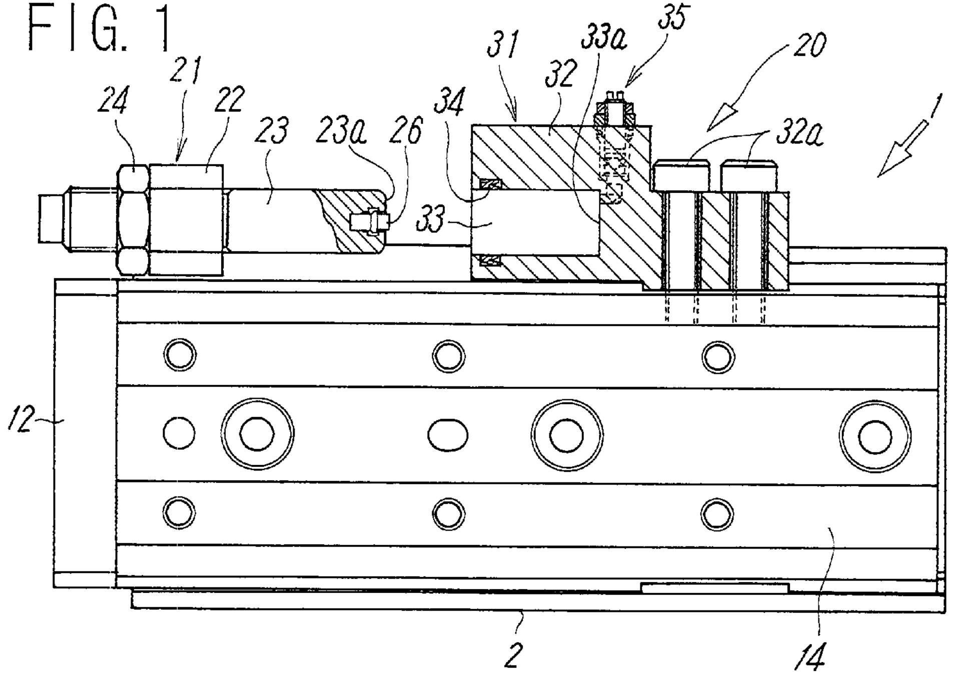
FIG. 1 is a partially cut-away plan view illustrating an example of an air cushion mechanism of a pneumatic cylinder according to the present invention.
Figure 2:
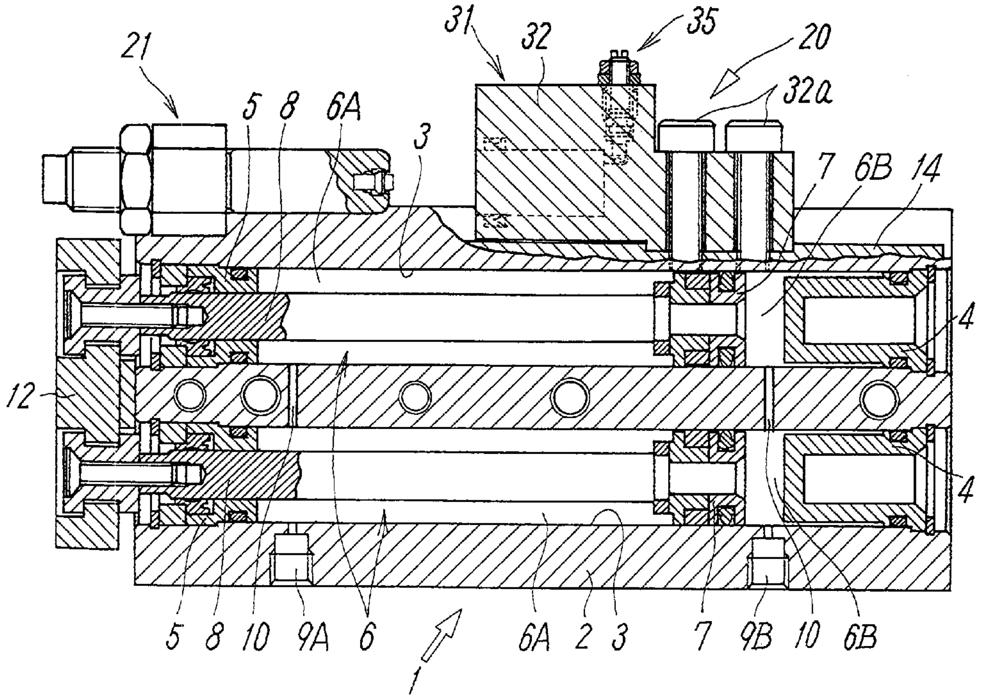
FIG. 2 is a plan view illustrating an essential part of the example in a section.
Figure 3:
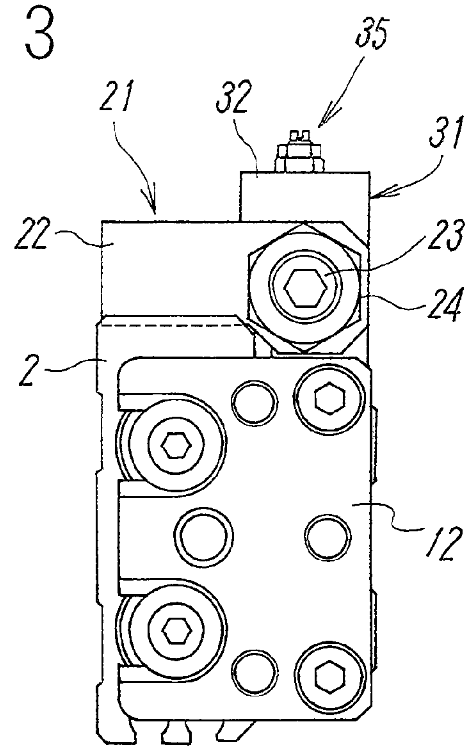
FIG. 3 is a left side view of FIG. 1.
Figure 4:
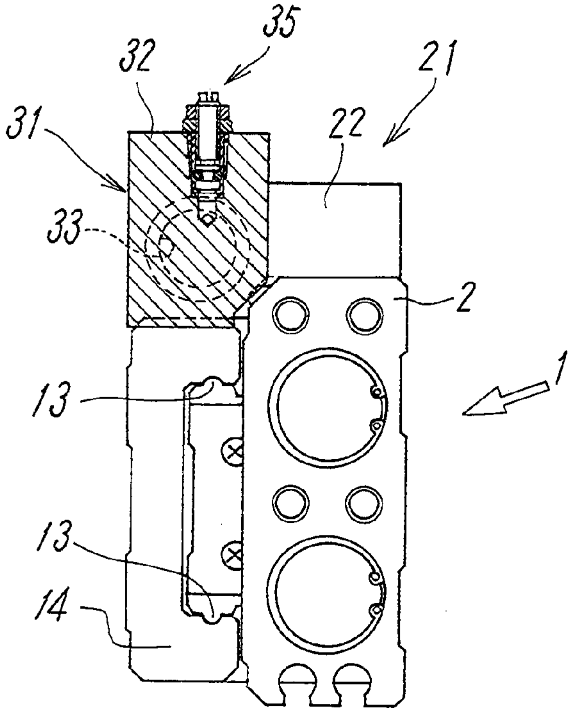
FIG. 4 is a right side view illustrating the same portion in a section.

FIGS. 1 to 6 show an example of an embodiment of a pneumatic cylinder provided with an air cushion mechanism according to the present invention. This pneumatic cylinder 1 includes, as shown clearly in FIG. 2, a pair of parallel holes 3 disposed adjacently in a body 2, one ends of the holes 3 being closed by head-side plugs 4, and rod-side bearing 5 being fitted and fixed to the other ends of the holes 3 so as to form cylinder chambers 6, a piston 7 driven by compressed air being disposed in the cylinder chamber 6, and a piston rod 8 connected to the piston 7 being inserted into the rod-side bearing 5 in an airtight manner and led out to the outside. The compressed air driving the piston 7 is supplied/discharged to/from each of supply/discharge ports 9A and 9B disposed on one side of the body 2 with respect to pressure chambers 6A and 6B divided by the piston 7 in one of the cylinder chambers 6 and supplied/discharged to/from the pressure chambers 6A and 6B of the other cylinder chamber 6 through a communication hole 10 disposed in a partition wall between the pair of holes 3.

In addition, the pair of piston rods 8 connected to the pistons 7 sliding in the pair of cylinder chambers 6 and led out to the outside from the cylinder chambers 6 have their led-out ends connected to a single connection plate 12, and a table 14 slidable along a guide 13 installed in parallel with a sliding direction of the pistons 7 on the body 2 is connected to the connection plate 12. The table 14 makes a load of a tool, a workpiece and the like fixable to the surface thereof.

An air cushion mechanism 20 which alleviates an impact acting to a load on the table 14 at a stroke end by stopping the piston 7 in the pneumatic cylinder 1 in a buffering manner is configured by a body-side cushion structural body 21 installed outside the body 2 and a piston-side cushion structural body 31 fixed to the table 14 so as to move integrally with the piston 7. The piston-side cushion structural body 31 is disposed opposite the sliding direction of the piston 7 with respect to the body-side cushion structural body 21 in a mode as described below in detail.

The body-side cushion structural body 21 is configured such that into a screw hole of a supporting base 22 fixedly attached to the body 2, a cushion rod 23 protruding in the sliding direction of the piston 7 toward the piston-side cushion structural body 31 is screwed so that its protruding position can be adjusted and the screwing position can be stably held by a lock nut 24.

On the other hand, the piston-side structural body 31 is configured such that in a supporting base 32 fixedly attached to the table 14 with a bolt 32*a*, a rod fitting hole 33 opened opposite the cushion rod 23 is disposed in a non-penetrating state, a cushion packing 34 sealing a gap between the cushion rod 23 and the rod fitting hole 33 when the cushion rod 23 is fitted is disposed, and on the supporting base 32, a throttle valve 35 communicating with the outside through a throttle capable of adjusting a flow rate in the rod fitting hole 33 is disposed.

The rod fitting hole 33 is a circular hole having a uniform hole diameter and a portion to be fitted into the rod fitting hole 33 of the cushion rod 23 is a column having a uniform outer diameter.

The cushion packing 34 is, as shown in FIG. 1, formed by a Y-shaped packing having a check valve function to prevent outflow of the air from inside the rod fitting hole 33 to the outside but allows inflow of the air from the outside into the rod fitting hole 33, and by using such packing, return of the cushion rod 23 in a direction to go out of the rod fitting hole 33 is expedited.

Figure 5:
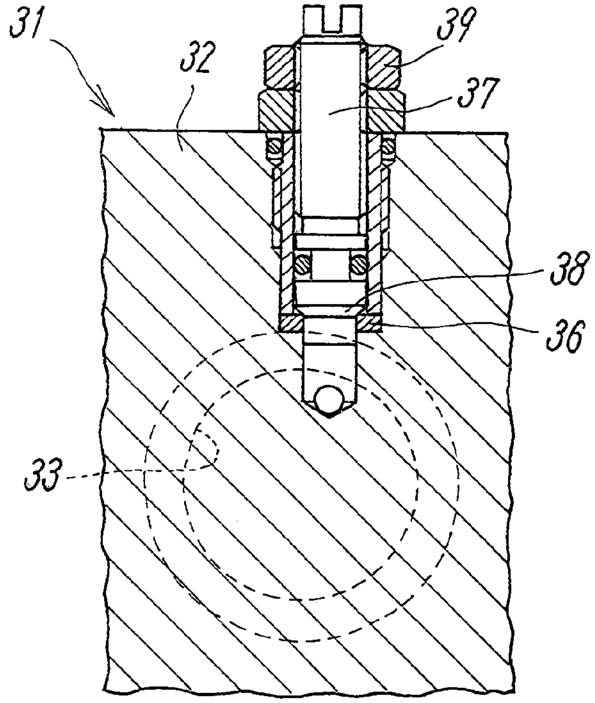
FIG. 5 is an enlarged sectional view of a throttle valve in the example.

In addition, the throttle valve 35 is, as shown in FIG. 5, a known one capable of adjustment of an outflow rate by configuring such that a screw-shaped valve body 37 provided with a valve portion 38 opposing a valve seat portion 36 can be fixed with a locknut 39 and the position of the valve portion 38 of the screw-shaped valve body 37 is adjusted by loosening the lock nut 39.

Figure 6:
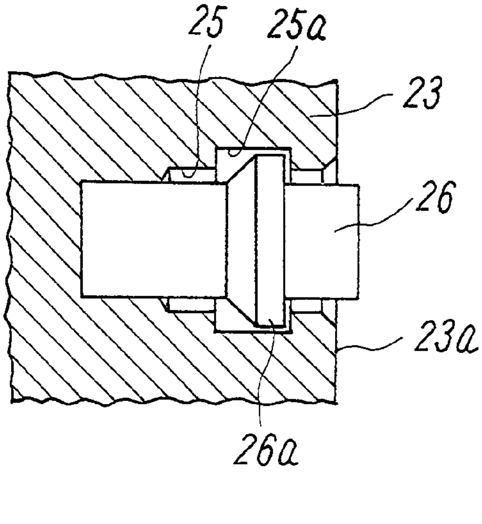
FIG. 6 is an enlarged sectional view of a damper disposed at a distal end of a cushion rod in the example.

On the other hand, as shown in an enlarged manner in FIG. 6, at a distal end of the cushion rod 23, a damper attachment hole 25 having a large diameter portion 25*a* in the middle is disposed, and a damper 26 made of a viscoelastic body formed by a soft synthetic resin or the like is attached to the damper attachment hole 25 in a state escape is prevented by engaging a locking flange portion 26*a* with the large diameter portion 25*a*. This damper 26 alleviates a colliding force when the cushion rod 23 is fitted in the rod fitting hole 33 by movement of the table 14 and a distal end face 23*a* of the cushion rod 23 collides against an inner end 33*a* of the rod fitting hole 33, and at a stroke end of the cushion rod 23, its entirety sinks in the damper attachment hole 25 by a pressing force of the cushion rod 23. As a result, while the colliding force of the cushion rod 23 at the stroke end is further alleviated, the distal end face 23*a* of the cushion rod 23 is positioned in contact with the inner end 33*a* of the rod fitting hole 33, and the stop position can be stabilized.

In the air cushion mechanism 20 of the pneumatic cylinder having the above configuration, if the cushion rod 23 drives the piston 7 in a direction to fit it in the rod fitting hole 33 by supply/discharge of the compressed air to/from the pressure chambers 6A and 6B and the cushion rod 23 starts to be fitted into the rod fitting hole 33, since a gap between an inner peripheral face of the rod fitting hole 33 and an outer peripheral face of the cushion rod 23 is sealed by the cushion packing 34 disposed at a spout portion of the rod fitting hole 33, the air inside the rod fitting hole 33 is contained and made to outflow through the throttle valve 35 in a limited manner. Thus, if the fitting of the cushion rod 23 into the rod fitting hole 33 further progresses, even if a part of the air in the rod fitting hole 33 outflows, a pneumatic pressure inside the rod fitting hole 33 is raised so as to give a braking force to the cushion rod 23, by which as a result, the piston 7 and the table 14 connected thereto can be stopped in a buffering manner.

If the stop position of the piston 7 and the table 14 connected thereto is to be changed, it is only necessary that the protruding position of the cushion rod 23 attached to the supporting table 22 is adjusted after loosening the lock nut 24 and the lock nut 24 is tightened again so as to fix the cushion rod 23 at that position.

In addition, at the stroke end of the cushion rod 23, as mentioned above, the colliding force of the cushion rod 23 is alleviated by the damper 26 disposed in the damper attachment hole 25 at the distal end of the cushion rod 23 and then, the damper 26 is pushed into the damper attachment hole 25 and the distal end face 23*a* of the cushion rod 23 itself is brought into contact with the inner end 33*a* of the rod fitting hole 33 in the end, by which the piston 7 and the table 14 are stopped at the set stop positions.

In the illustrated example, the cushion rod 23 is disposed on the body-side cushion structural body 21 and the rod fitting hole 33 into which the cushion rod 23 is fitted is disposed in the piston-side cushion structural body 31, but installation of the cushion rod 23 and the rod fitting hole 33 may be vice versa.

In addition, in the above example, the supporting base 22 of the body-side cushion structural body 21 is fixed to the body 2, the supporting base 32 of the piston-side cushion structural body 31 is fixedly attached to the table 14 connected to the piston 7, and the cushion rod 23 is screwed with the supporting base of the one cushion structural body capable of positional adjustment so that the piston position when the cushion rod 23 is fitted into the inner end 33*a* of the rod fitting hole 33 is adjusted, but it may be so configured that at least one of the attachment positions of the pair of cushion structural bodies 21 and 31 with respect to the body 2 or the table 14 can be moved with respect to other in the sliding direction of the piston 7, and piston position when the cushion rod 23 is fitted into the inner end 33*a* of the rod fitting hole 33 is adjusted by adjusting their attachment positions. In this case, the cushion rod 23 may be screwed with the one cushion structural body capable of positional adjustment or may be fixedly disposed on the cushion structural body.

In essence, it is only necessary that the installation positions of the cushion rod 23 and the rod fitting hole 33 can be relatively adjusted in the sliding direction of the piston 7 and the piston position when the cushion rod 23 is fitted into the inner end 33*a* of the rod fitting hole 33 can be arbitrarily set.

In addition, in the above example, the air cushion mechanism that stops the piston in a buffering manner during driving in 1 direction of the piston 7 has been described, but two pairs of cushion structural bodies 21 and 31 can be installed opposing each other so that they are stopped in a buffering manner with respect to the driving in the both directions of the piston 7.

Moreover, according to the air cushion mechanism 20, without using the compressibility of air remaining in the discharge-side pressure chamber as in the prior-art cylinder, the impact absorbing function is exerted by the air cushion mechanism independent from the air supply/discharge system of the pneumatic cylinder, and thus, by attaching the above-mentioned pair of cushion structural bodies 21 and 31 to the body side and the piston side in an existing pneumatic cylinder or a rodless cylinder not provided with the air cushion mechanism, the air cushion mechanism that exerts a large impact absorbing capability can be applied to the pneumatic cylinders.

The invention claimed is:

1. An air cushion mechanism of a pneumatic cylinder provided with a piston slidably fitted into a cylinder chamber of a body, comprising:

a cushion structural body on the body side attached to outside of the body; and a cushion structural body on a piston side disposed outside the body opposing a sliding direction of the piston with respect to the body-side cushion structural body and integrally moving with the piston, wherein either one of the cushion structural bodies has a cushion rod protruding to the other cushion structural body, the other cushion structural body has a rod fitting hole opened opposite to the cushion rod, a cushion packing that seals a gap between the cushion rod and the rod fitting hole when the cushion rod is fitted in the rod fitting hole is disposed in an internal circumference of the rod fitting hole, an entire opening of an end of the rod fitting hole being directly opened to the atmosphere, the cushion packing being formed by a Y-shaped sectional lip packing having a check valve function, the cushion packing being disposed so as to prevent outflow of the air from inside the rod fitting hole to the outside but to allow inflow of the atmospheric air from the outside into the rod fitting hole by directing the lip toward interior of the rod fitting hole, and moreover, a throttle valve that causes the rod fitting hole to communicate with the outside through a throttle capable of flow-rate adjustment is disposed at a position which is nearer to an inner end than is the cushion packing of the rod fitting hole so as to configure the air cushion mechanism in which the piston stops in a buffering manner at a position where the cushion rod is fitted into the inner end of the rod fitting hole by an air cushion effect caused when atmospheric air in the rod fitting hole is compressed by the cushion rod, while the cushion rod is fitted into the inner end of the rod fitting hole; and installation positions of the cushion rod and the rod fitting hole are made capable of relative adjustment in the sliding direction of the piston, by which a stop position of the piston can be changed.

2. The air cushion mechanism according to claim 1, wherein a damper made of a viscoelastic body that alleviates a colliding force when the cushion rod collides against the inner end of the rod fitting hole is installed in a damper attachment hole disposed at a distal end of the cushion rod so as to immerse in the damper attachment hole at a stroke end of the cushion rod.

3. The air cushion mechanism according to claim 2, wherein the damper attachment hole has a large diameter portion in the middle, while the damper has a locking flange portion in the middle, and the damper is prevented from escaping from the damper attachment hole by engaging the locking flange portion with the large diameter portion.

4. The air cushion mechanism according to claim 1, wherein the cushion rod is attached to the one cushion structural body capable of positional adjustment, and a stop position of the piston is changed by the positional adjustment of the cushion rod.

5. The air cushion mechanism according to claim 2, wherein the cushion rod is attached to the one cushion structural body capable of positional adjustment, and a stop position of the piston is changed by the positional adjustment of the cushion rod.

6. The air cushion mechanism according to claim 1, wherein at least either one of the installation position of the body-side cushion structural body to the body and the installation position of the piston-side cushion structural body to the piston is made capable of adjustment, and by moving the one cushion structural body in the sliding direction of the piston with respect to the other cushion structural body, a stop position of the piston is changed.

7. The air cushion mechanism according to claim 2, wherein at least either one of the installation position of the body-side cushion structural body to the body and the installation position of the piston-side cushion structural body to the piston is made capable of adjustment, and by moving the one cushion structural body in the sliding direction of the piston with respect to the other cushion structural body, a stop position of the piston is changed.

8. The air cushion mechanism according to claim 1, wherein to a piston rod connected to the piston and led out to the outside from the cylinder chamber, a table slidable along a guide disposed in parallel with the sliding direction of the piston on the body is connected, and the piston-side cushion structural body is attached to the table.

9. The air cushion mechanism according to claim 2, wherein to a piston rod connected to the piston and led out to the outside from the cylinder chamber, a table slidable along a guide disposed in parallel with the sliding direction of the piston on the body is connected, and the piston-side cushion structural body is attached to the table.

10. The air cushion mechanism according to claim 4, wherein to a piston rod connected to the piston and led out to the outside from the cylinder chamber, a table slidable along a guide disposed in parallel with the sliding direction of the piston on the body is connected, and the piston-side cushion structural body is attached to the table.

11. The air cushion mechanism according to claim 6, wherein to a piston rod connected to the piston and led out to the outside from the cylinder chamber, a table slidable along a guide disposed in parallel with the sliding direction of the piston on the body is connected, and the piston-side cushion structural body is attached to the table.

12. A pneumatic cylinder comprising a body defining a cylinder chamber therein, a piston slidably fitted in the cylinder chamber, compressed gas supply and discharge ports communicating with the cylinder chamber to drive the piston for movement in the cylinder chamber, and an air cushion mechanism for cushioning an end of a stroke of the piston in the cylinder chamber, the air cushion mechanism including:

a cushion structural body on the body side attached to outside of the body; and a cushion structural body on a piston side disposed outside the body opposing a sliding direction of the piston with respect to the body-side cushion structural body and integrally moving with the piston, wherein either one of the cushion structural bodies has a cushion rod protruding to the other cushion structural body, the other cushion structural body has a rod fitting hole opened opposite to the cushion rod, a cushion packing that seals a gap between the cushion rod and the rod fitting hole when the cushion rod is fitted in the rod fitting hole is disposed in an internal circumference of the rod fitting hole, an entire opening of an end of the rod fitting hole being directly opened to the atmosphere, the cushion packing being formed by a lip packing having a check valve function, the lip packing being disposed so as to prevent outflow of the air from inside the rod fitting hole to the outside but to allow inflow of the atmospheric air from the outside into the rod fitting hole by directing the lip toward interior of the rod fitting hole, and moreover, a throttle valve that causes the rod fitting hole to communicate with the outside through a throttle capable of flow-rate adjustment is disposed at a position which is nearer to an inner end than is the cushion packing of the rod fitting hole so as to configure the air cushion mechanism in which the piston stops in a buffering manner at a position where the cushion rod is fitted into the inner end of the rod fitting hole by an air cushion effect caused when atmospheric air in the rod fitting hole is compressed by the cushion rod, while the cushion rod is fitted into the inner end of the rod fitting hole; and installation positions of the cushion rod and the rod fitting hole are made capable of relative adjustment in the sliding direction of the piston, by which a stop position of the piston can be changed.

* * * * *